US012029700B2

(12) United States Patent
Drath et al.

(10) Patent No.: US 12,029,700 B2
(45) Date of Patent: Jul. 9, 2024

(54) SPINE EXTENSION ROLLER

(71) Applicants: Thomas Walter Drath, Phoenix, AZ (US); Daniel Albert Drath, Phoenix, AZ (US)

(72) Inventors: Thomas Walter Drath, Phoenix, AZ (US); Daniel Albert Drath, Phoenix, AZ (US)

(*) Notice: Subject to any disclaimer, the term of this patent is extended or adjusted under 35 U.S.C. 154(b) by 234 days.

(21) Appl. No.: 16/946,761

(22) Filed: Jul. 6, 2020

(65) Prior Publication Data

US 2020/0397649 A1 Dec. 24, 2020

Related U.S. Application Data

(63) Continuation-in-part of application No. 15/142,311, filed on Apr. 29, 2016, now Pat. No. 10,702,446.

(51) Int. Cl.
*A61H 15/00* (2006.01)

(52) U.S. Cl.
CPC ..... *A61H 15/00* (2013.01); *A61H 2015/0014* (2013.01); *A61H 2201/0119* (2013.01); *A61H 2201/1253* (2013.01); *A61H 2201/1623* (2013.01); *A61H 2201/1635* (2013.01); *A61H 2203/0456* (2013.01); *A61H 2205/081* (2013.01)

(58) Field of Classification Search
CPC .. A61H 1/005–02; A61H 1/0292–0296; A61H 7/00–005; A61H 7/007; A61H 2007/009; A61H 15/00–02; A61H 2201/0119; A61H 2201/1253–1269; A61H 2201/1284; A61H 2201/1609; A61H 2201/1623; A61H 2201/1635; A61H 2201/1671; A61H 2203/0443–0456; A61H 2205/04; A61H 2205/081
See application file for complete search history.

(56) References Cited

U.S. PATENT DOCUMENTS

| | | | | | |
|---|---|---|---|---|---|
| 1,265,083 | A | * | 5/1918 | Hoard | A61H 15/00 601/118 |
| 1,322,720 | A | * | 11/1919 | Noble | A61H 15/0078 601/102 |
| 2,377,131 | A | * | 5/1945 | Conrad | A61H 15/00 D24/211 |
| 3,750,654 | A | | 8/1973 | Shiu | |
| 4,716,891 | A | | 1/1988 | Yorgan | |
| 4,832,006 | A | | 5/1989 | Kirsch | |
| 5,038,757 | A | | 8/1991 | Yamasaki | |
| 5,348,529 | A | | 9/1994 | Veltri | |
| 5,577,995 | A | | 11/1996 | Walker et al. | |

(Continued)

FOREIGN PATENT DOCUMENTS

| | | |
|---|---|---|
| EP | 2 604 243 | 6/2013 |
| WO | WO 96/00555 | 1/1996 |

*Primary Examiner* — Rachel T Sippel
(74) *Attorney, Agent, or Firm* — Venjuris, P.C.

(57) ABSTRACT

The invention is embodied in an apparatus for extending the human back. The preferred apparatus has a frame of transverse and longitudinal members, and a roller 20 rigidly supported from below by a transverse member. The space above the roller and frame is open so that a user can lie face up on the roller and grab the longitudinal members with each hand to extend the back over the top of the roller. The user then lowers his hips to extend the spine as much as desired. The user can roll the spine, vertebrae by vertebrae, from the base of the occipital to the sacrum.

6 Claims, 15 Drawing Sheets

(56) References Cited

U.S. PATENT DOCUMENTS

| | | | | |
|---|---|---|---|---|
| 5,772,614 | A | 6/1998 | Lindquist | |
| 5,848,980 | A | 12/1998 | Demerais | |
| 5,935,090 | A | 8/1999 | Kennon | |
| 6,056,709 | A | 5/2000 | Hashimoto | |
| 6,315,742 | B1 | 11/2001 | Howard | |
| 6,589,192 | B2 | 7/2003 | Chan et al. | |
| 6,648,904 | B2 | 11/2003 | Altschuler | |
| 6,974,427 | B1 * | 12/2005 | Lapham | A61H 15/00 601/135 |
| D700,709 | S | 3/2014 | Khodabakhshian | |
| 10,492,975 | B2 * | 12/2019 | Mangino, Jr. | A61H 7/001 |
| 2004/0097853 | A1 * | 5/2004 | Aidiniantz | A61H 1/008 601/115 |
| 2004/0127823 | A1 | 7/2004 | Mori | |
| 2004/0236256 | A1 * | 11/2004 | Kim | A61H 15/0078 601/102 |
| 2005/0215928 | A1 | 9/2005 | Banks et al. | |
| 2006/0084893 | A1 | 4/2006 | Marten | |
| 2007/0093367 | A1 * | 4/2007 | Walton | A61H 7/001 482/142 |
| 2007/0179415 | A1 * | 8/2007 | Evans | A61H 15/0078 601/126 |
| 2009/0112137 | A1 | 4/2009 | Lamore | |
| 2010/0145243 | A1 | 6/2010 | Kantor | |
| 2014/0024983 | A1 * | 1/2014 | Numata | A61H 15/0078 601/99 |
| 2014/0336022 | A1 | 11/2014 | Jones | |
| 2015/0257969 | A1 | 9/2015 | Shannon | |
| 2016/0022529 | A1 | 1/2016 | Abdo | |
| 2016/0129302 | A1 | 5/2016 | Vallo | |
| 2017/0156962 | A1 * | 6/2017 | Eum | A61H 1/0292 |
| 2017/0231862 | A1 | 8/2017 | Olschansky | |
| 2018/0280228 | A1 * | 10/2018 | Bouch | A61H 1/005 |

* cited by examiner

SPINE EXTENSION ROLLER

FIELD OF THE INVENTION

The present invention relates to rolling and extending the spine.

BACKGROUND

Foam rolling is a common technique and its benefits are well known. When foam rolling the back, a user will lie face up on a cylindrically-shaped foam roller with the roller oriented to roll lengthwise along the spine. The user may use the feet to assist moving the spine lengthwise over the foam roller. (See, e.g., FIG. 1.) While the benefits of foam rolling the back in this way are tangible, they are limited because a user's weight is distributed along the length of the roller. Once the user's body adjusts to the user's weight on the roller the benefits, while still tangible, diminish over time.

What is needed is an improved spine roller that can load the facet joints more directly and to a greater degree in order to provide additional benefits to a user beyond what the user could do with a foam roller alone.

SUMMARY OF THE INVENTION

This invention comprises two key elements: (1) the roller and (2) the grab bars. When combined as described herein, the invention provides its user with a more effective method of positively manipulating the spine's facet joints and achieving spinal extension. In addition, this invention allows a user to mobilize the entire length of the spine, from the base of the occipital to the sacrum.

The spatial relationship between the roller and the grab bars allow a user to dynamically increase spinal extension as shown in FIGS. 2-3. By holding on the grab bars while dropping the hips, a user can self-achieve greater levels of facet manipulation, thereby allowing a user more effective results in a shorter period of time. Without grab bars, one simply cannot effectively counterbalance the spinal flexion that is invariably imposed on the human body functioning in a primarily sedentary culture.

The roller/grab bar combination enables a user to re-establish more favorable spinal facet extension in (a) a horizontal closed kinetic chain environment and (b) a non-compressive spinal loading environment (see FIGS. 2-3). This environment provides a user with more control as the user attempts greater range of motion in the facet joints. Typical standing and back-bending environments common in yoga and other practices are performed in open kinetic chain and under spinal load, and with inherently less user control.

BRIEF DESCRIPTION OF THE DRAWINGS OR PICTURES

DETAILED DESCRIPTION

Figure 1:
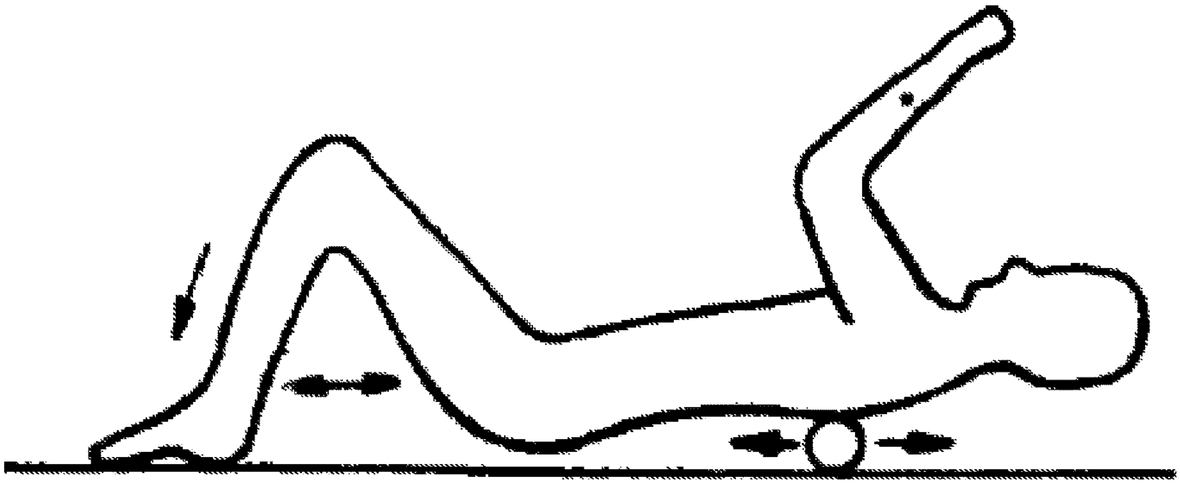
Fig. 1 Prior Art
FIG. 1 illustrates a prior art device.
Figure 2:
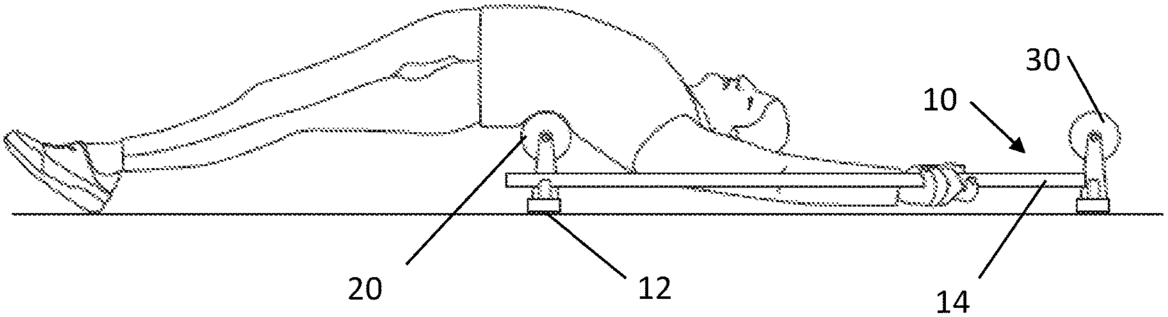
FIG. 2 illustrates a side view of a person using a preferred embodiment of the apparatus 5.
Figure 3:
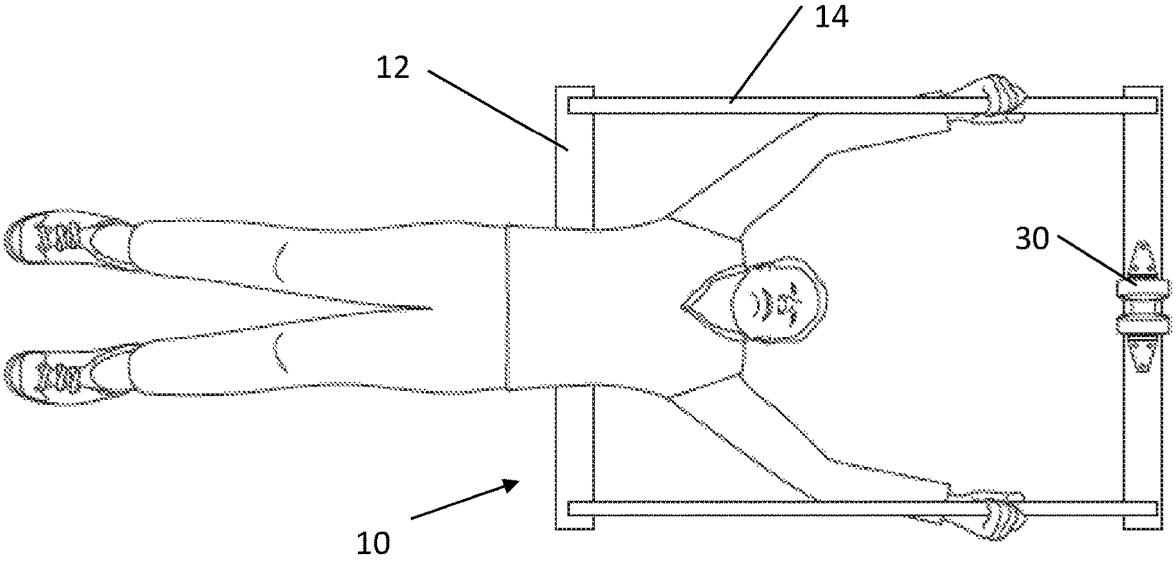
FIG. 3 illustrates of a top view of a person using a preferred embodiment of the apparatus 5.
Figure 4:
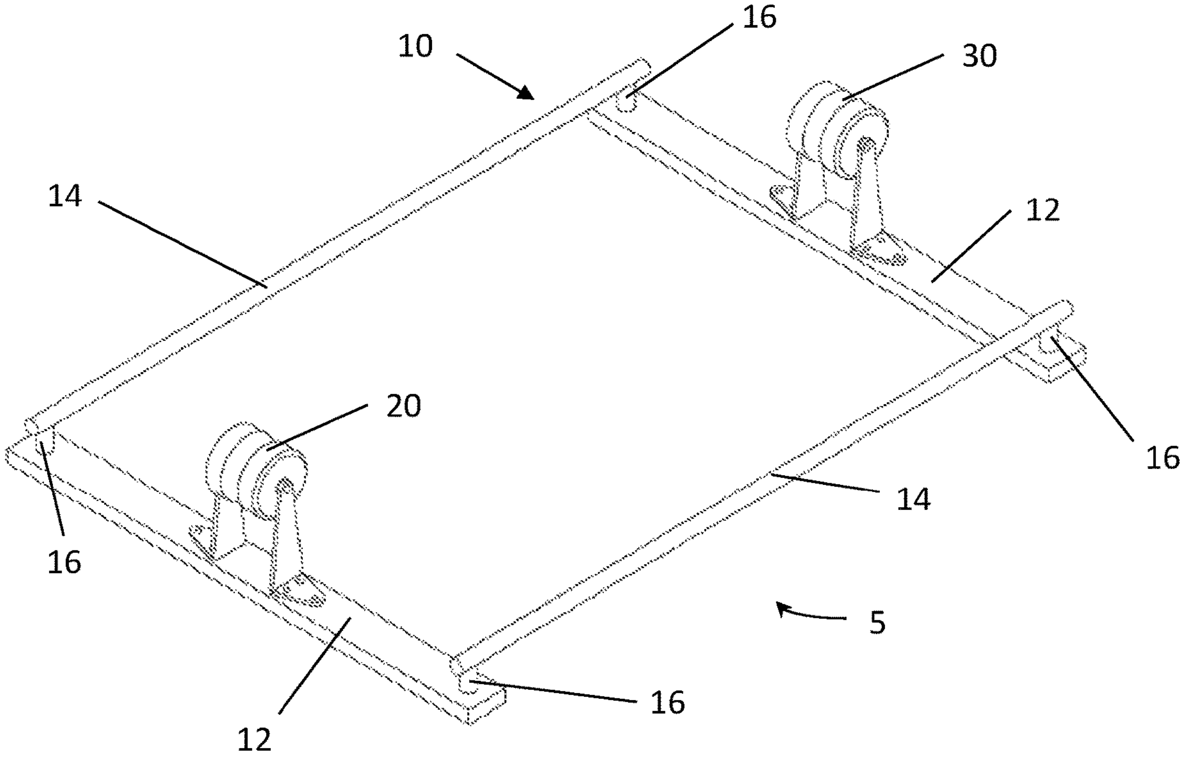
FIG. 4 illustrates a front perspective view of a preferred embodiment of the apparatus 5.
Figure 5:
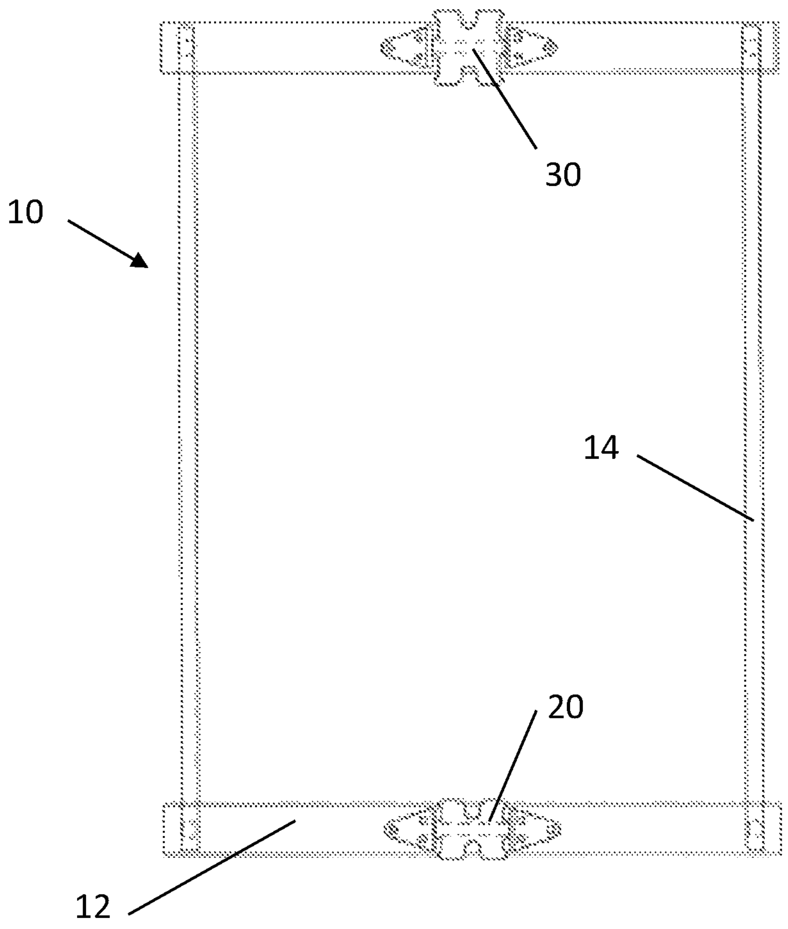
FIG. 5 illustrates a top view of a preferred embodiment of the apparatus 5.
Figure 6:
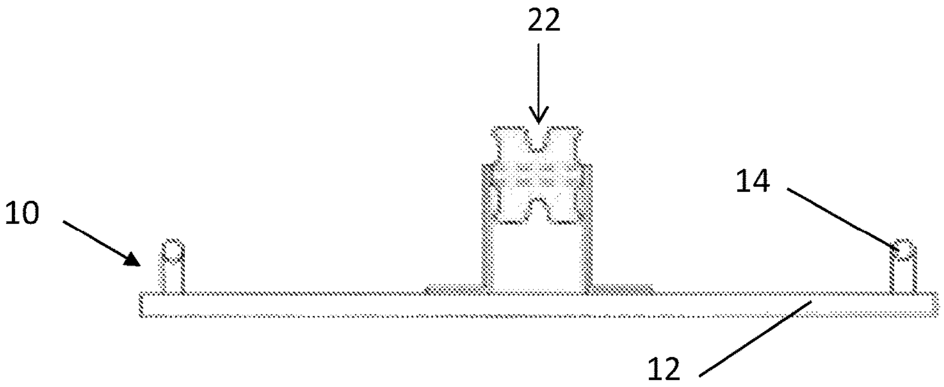
FIG. 6 illustrates a side view of a preferred embodiment of the apparatus 5.
Figure 7:
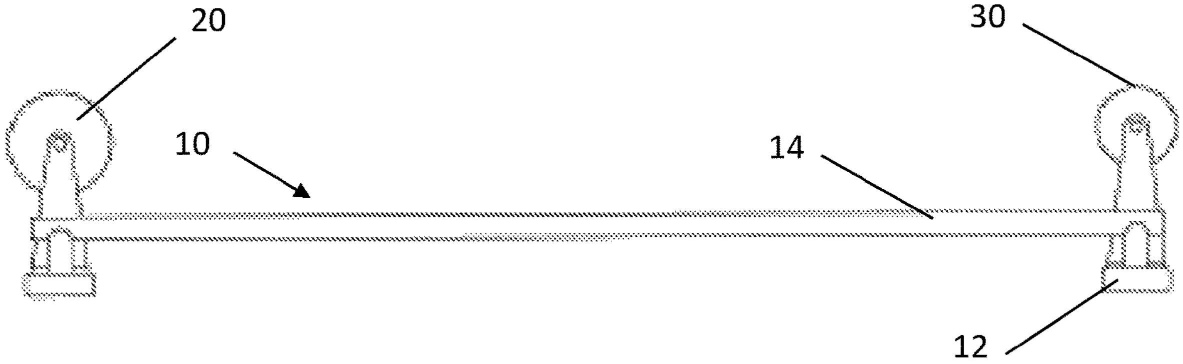
FIG. 7 illustrates a side view of a preferred embodiment of the apparatus 5.

The invention is embodied in an apparatus for extending the human back. As shown in FIGS. 2-9, the preferred apparatus has a frame 10, comprising transverse members 12 and longitudinal members 14. A roller 20 is rigidly supported from below by the transverse member 12. The space above the roller 20 and frame 10 is open so that a user can lie face up on the roller and grab the longitudinal members 14 with each hand to extend the back over the top of the roller as illustrated in FIG. 2-3. The user then lowers his hips to extend the spine as much as desired. The user can roll the spine, vertebrae by vertebrae, from the base of the occipital to the sacrum.

The preferred frame 10 is constructed from steel members bolted together, although welding or most any connection known in the art would suffice. The transverse member 12 is preferably a rectangular tube. The longitudinal members 14 are preferably circular tubes connected to the top sides of transverse members 12 at joints 16. Connecting the longitudinal members 14 to the top sides of the transverse members 12 creates a space under the longitudinal members 14 when the transverse members 12 are resting on the ground or floor. This space allows a user of the apparatus to grab each longitudinal member 14 while using the apparatus. The preferred frame is 48" (inches) by 32". The frame 10 could be collapsible for easy storage if desired. There are many ways to construct a collapsible frame known in the art. One example is to add locking hinges on two of the joints 16 and latches on the remaining two joints 16 so that the frame can be collapse and stored in the collapsed position. Alternatively, one or more of the members, like the longitudinal members, could be a telescoping member so its length could be shortened for easier storage.

The preferred roller 20 is made from polyvinyl chloride (pvc), but any rigid material will work. The roller rotates about an axis substantially perpendicular to the longitudinal members to that a user's hand can travel up and down the longitudinal member as the user moves the length of his or her back over the roller.

The preferred roller 20 has an open channel 22 that runs around the circumference of the roller 20. The channel is oriented substantially parallel to the longitudinal members so that when the user is face-up on the roller 20, the spinous process passes through the open channel and the surface 21 of roller 20 rest over the facet joints, not on the spinous process part of the vertebrae.

The dimensions of the roller can vary greatly to suit a user's preference, but a roller 20 between 2" (inches) and 6" in diameter, and preferably between 3.5" and 4.5", has been found to work well. Likewise, a channel 22 having width 24 that is 1" wide and a depth of 1" deep is preferable. A roller width 26 on either side of the channel that is preferably 1.5" wide has been found to work well. The preferable height 28 between the top of the roller and the floor is between 3" and 12" with 8" being most preferred.

Figure 8:
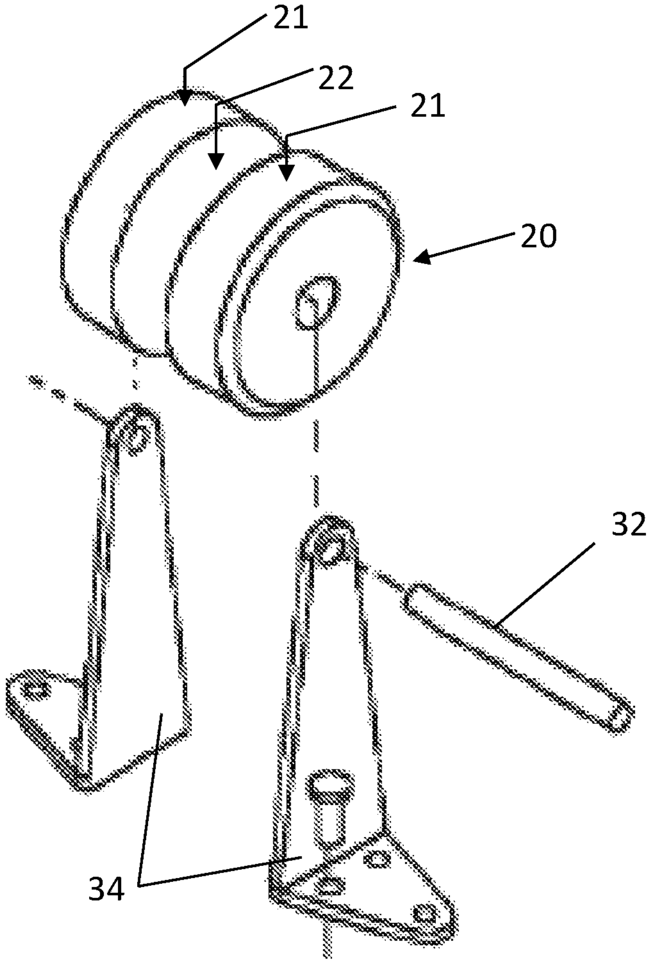
FIG. 8 illustrates an exploded view of a preferred roller assembly.
Figure 9:
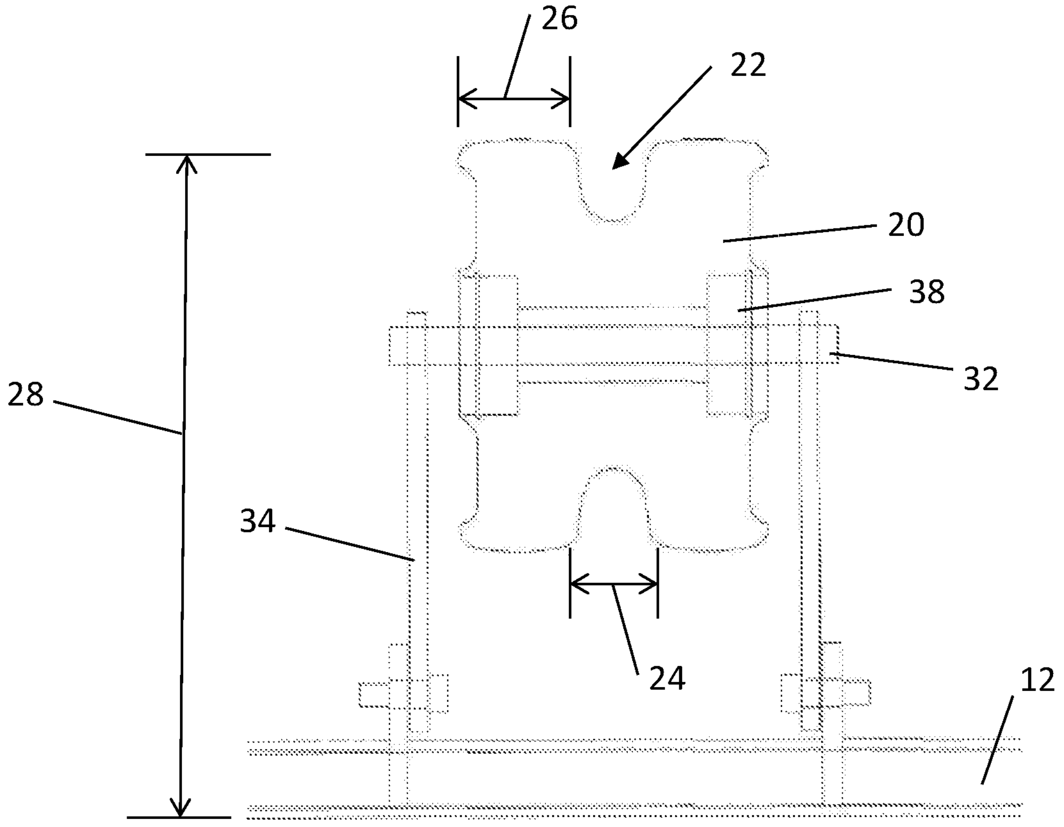
FIG. 9 illustrates a front view of an embodiment of a roller assembly.

The preferred roller spins on a shaft 32. The shaft 32 is supported on either end by vertical members 34. The vertical members 34 are connected to the frame 10, preferably by welding, but other connections like bolting as shown in FIG. 8 are suitable. Optionally, on a pair of roller bearings 38 can be added but have been found unnecessary.

Additionally, the width of the roller 10 allows a user to mobilize the body's scapula. All of these elements of the spine are associated with the idea of movement within each segment of the spine. This is important for reasons of optimally nourishing the spinal disks, while also allowing the appropriate levels of innervation throughout the entire body that begins at each segment of the vertebra.

An optional second roller 30 can be mounted just like the first roller 20 on the opposite traverse member 12 from the first roller 20. This optional second roller 30 could have different dimensions than the first roller 20 or could be located higher or lower than the first roller 20 to provide a user two different rolling options in one device. Either way, the second roller 30 is not required to practice the invention.

Optional Embodiments

Figure 10:
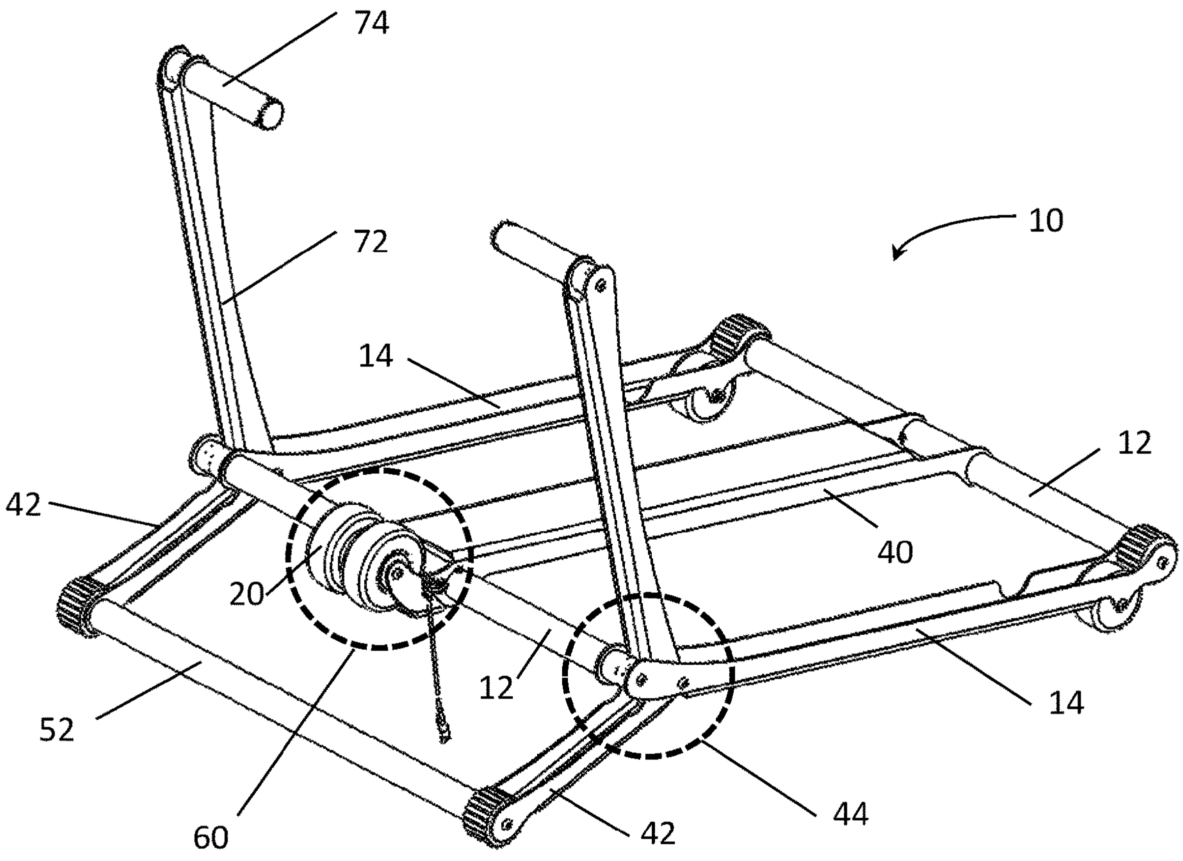
FIG. 10 illustrates a perspective view of an optional embodiment of the apparatus 5.

FIGS. 10-24 illustrate various optional embodiments that can provide additional features and enhancements. For example FIG. 10 illustrates a frame 10, comprising transverse members 12, longitudinal members 14, and roller 20. In addition, FIG. 10 also illustrates an interior longitudinal member 40. This interior longitudinal member 40 is connected at the ends to the two transverse members 12. It is preferred to orient the interior longitudinal member 40 to run parallel to the longitudinal members 14. The preferred purpose of the interior longitudinal member is to stiffen the frame 10, provide a smooth surface to support a user's upper body during use and to provide flanges 62 for receiving the roller assembly 60.

Also shown in FIG. 10 are legs 42. Legs 42 are connected to the frame 10 and preferably articulate with the frame 10 so that one transverse member 12 can be raised or lowered relative to the other transverse member 12. The raising of one of the transverse members 12 enables one way for a user to raise and lower the height of the roller relative to the floor.

Figure 11:
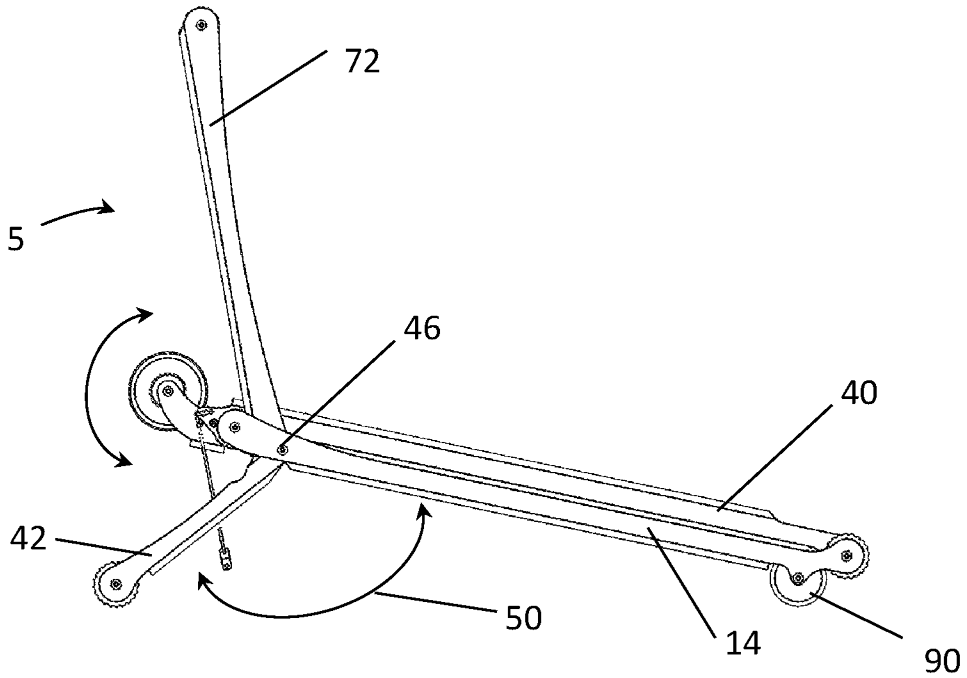
FIG. 11 illustrates a side view of an optional embodiment of the apparatus 5.
Figure 12:
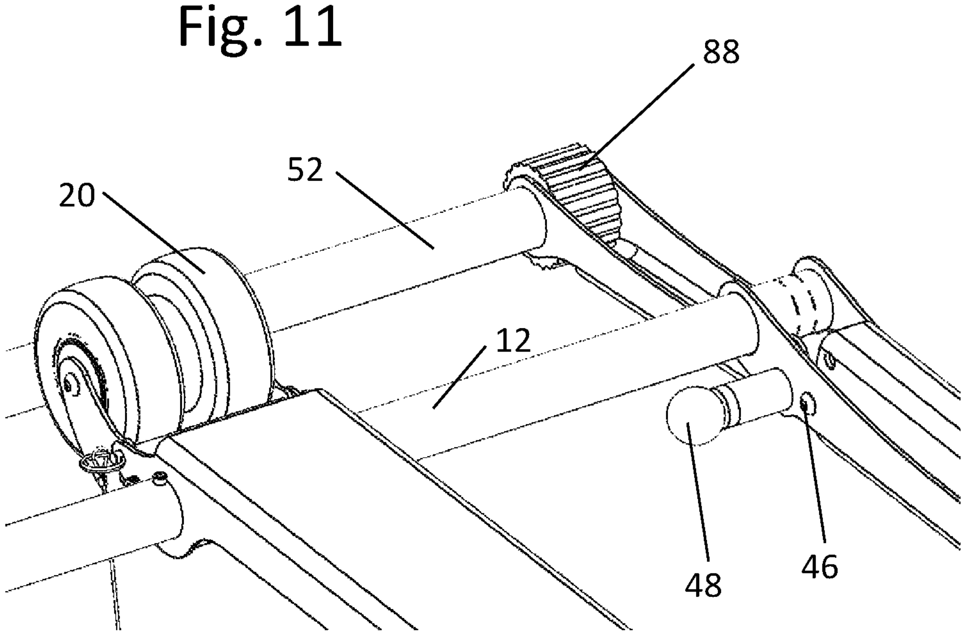
FIG. 12 illustrates a perspective view of an optional embodiment of the roller assembly and the leg connection assembly.
Figure 13:
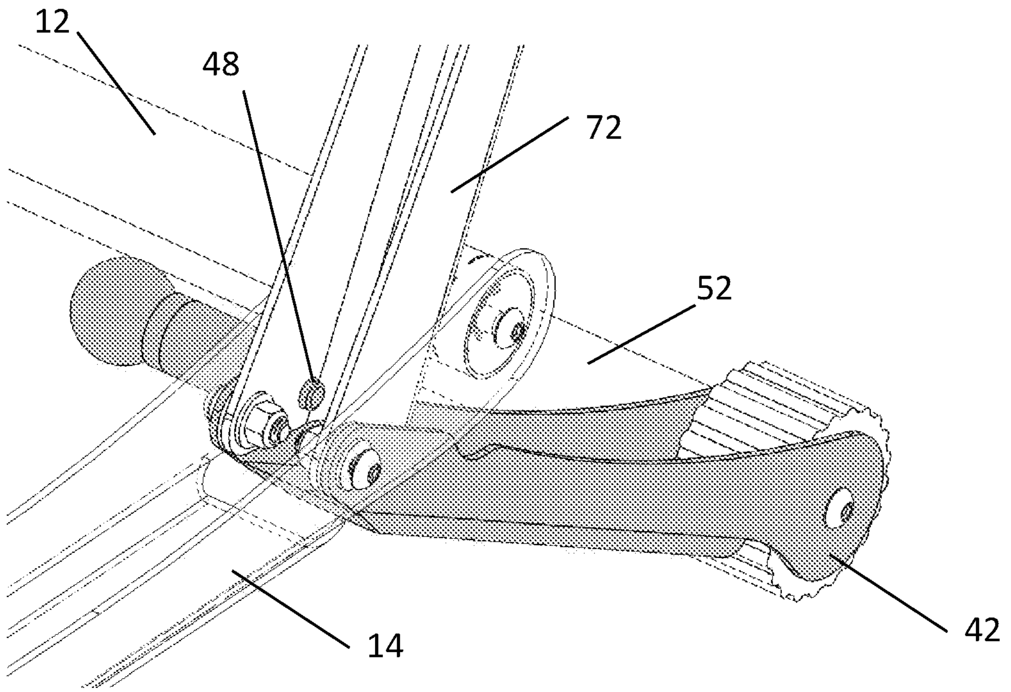
FIG. 13 illustrates a perspective view of the leg connection assembly shown in FIG. 12 with a longitudinal member 14 shown transparently.
Figure 14:
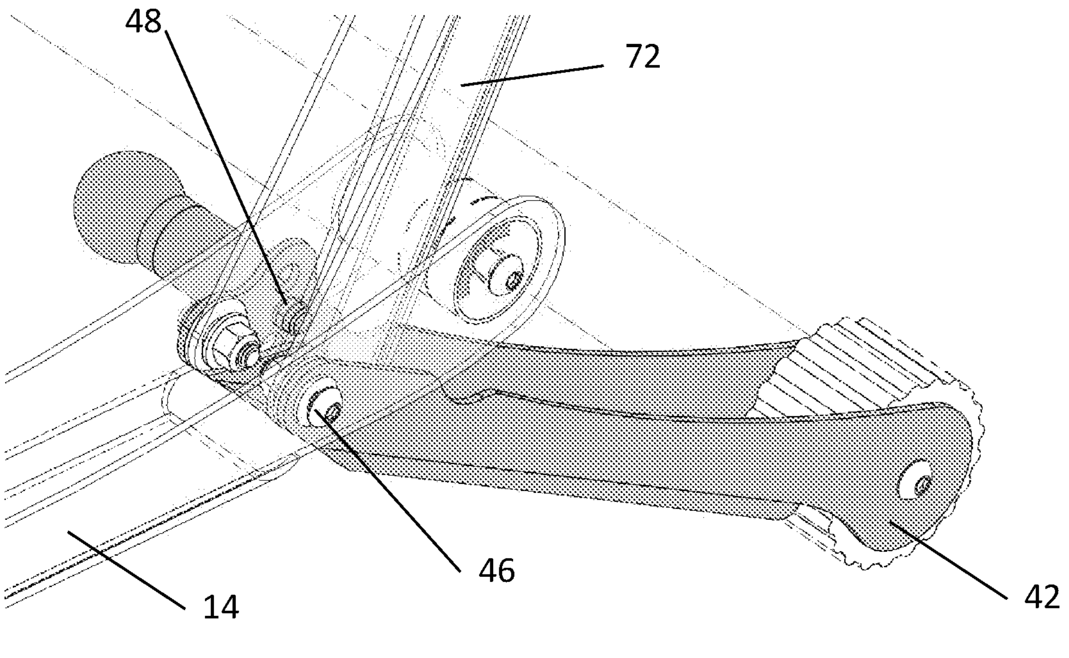
FIG. 14 illustrates a perspective view of the leg connection assembly shown in FIG. 12 with longitudinal member 14 and handle extension 72 shown transparently.
Figure 15:
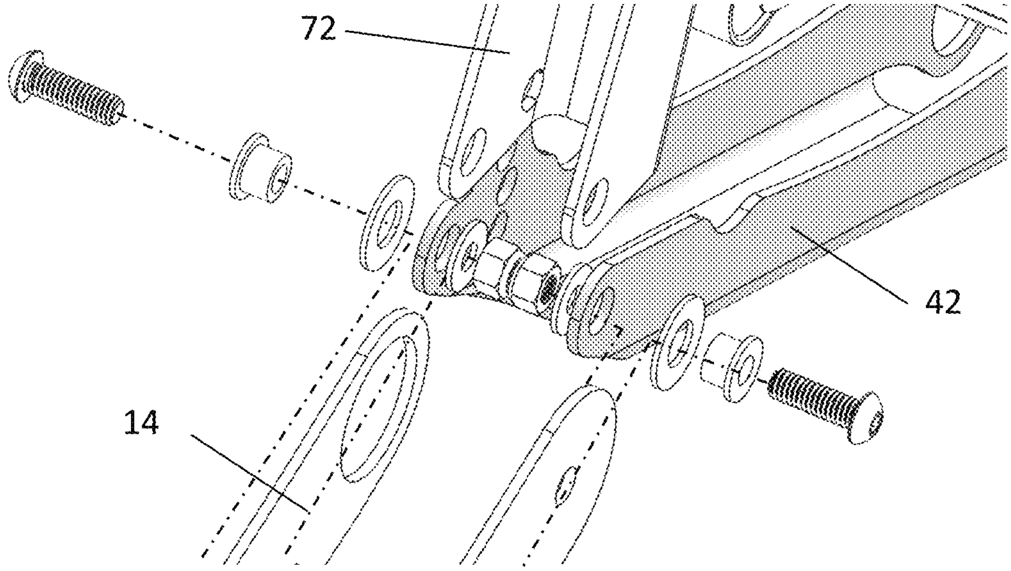
FIG. 15 illustrates an exploded view of the leg connection assembly of FIG. 12.
Figure 16:
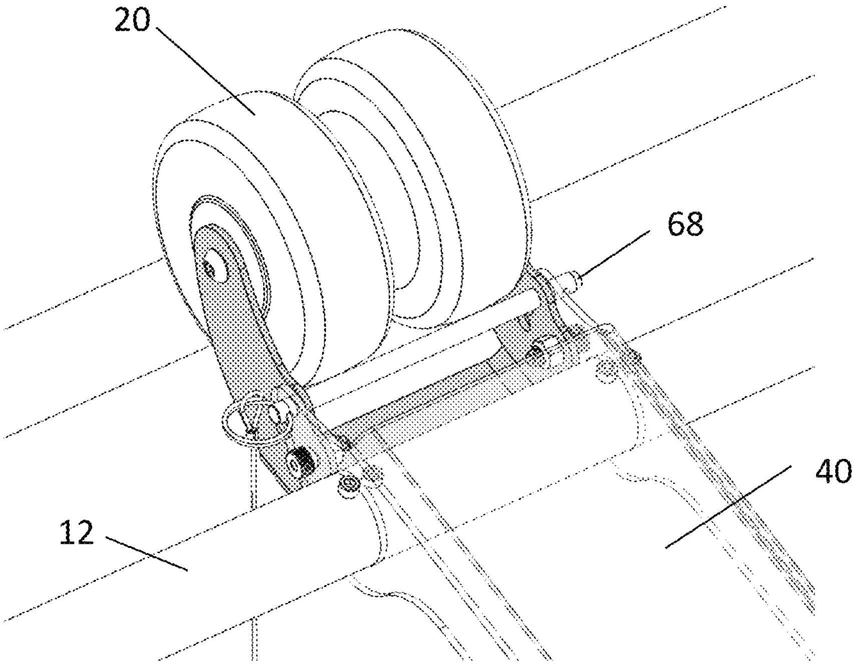
FIG. 16 illustrates a top perspective view of a roller assembly embodiment with the interior longitudinal member shown transparently.
Figure 17:
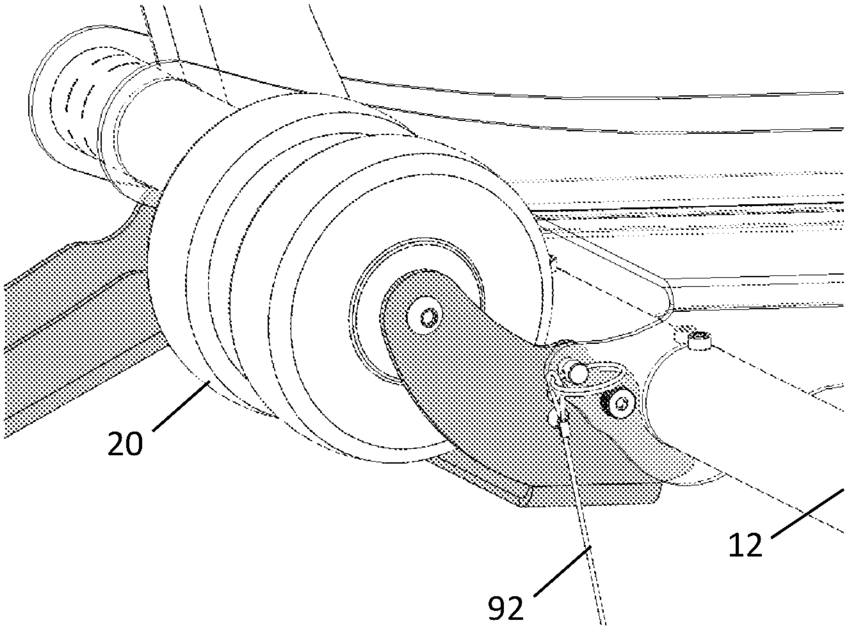
FIG. 17 illustrates a side perspective view of the roller assembly of FIG. 16 with the interior longitudinal member shown transparently.
Figure 22:
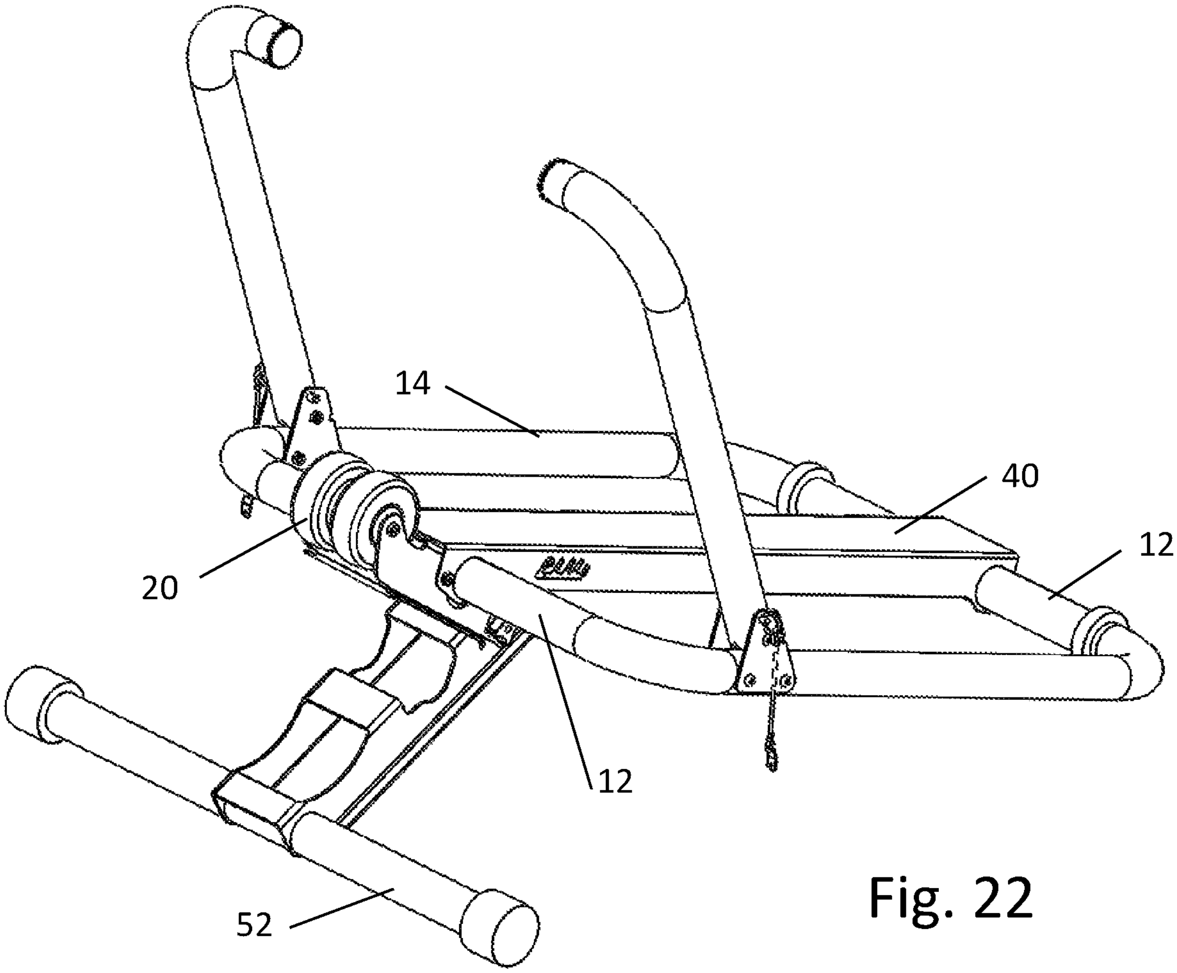
FIG. 22 illustrates a perspective view of another optional embodiment of the apparatus 5.
Figure 23:
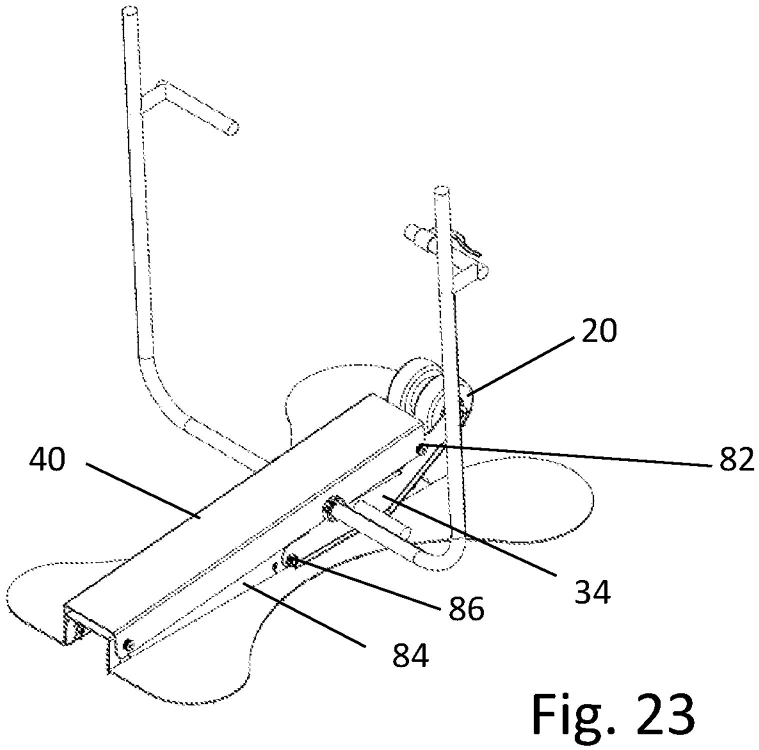
FIG. 23 illustrates a perspective view of another optional embodiment of the apparatus 5.
Figure 24:
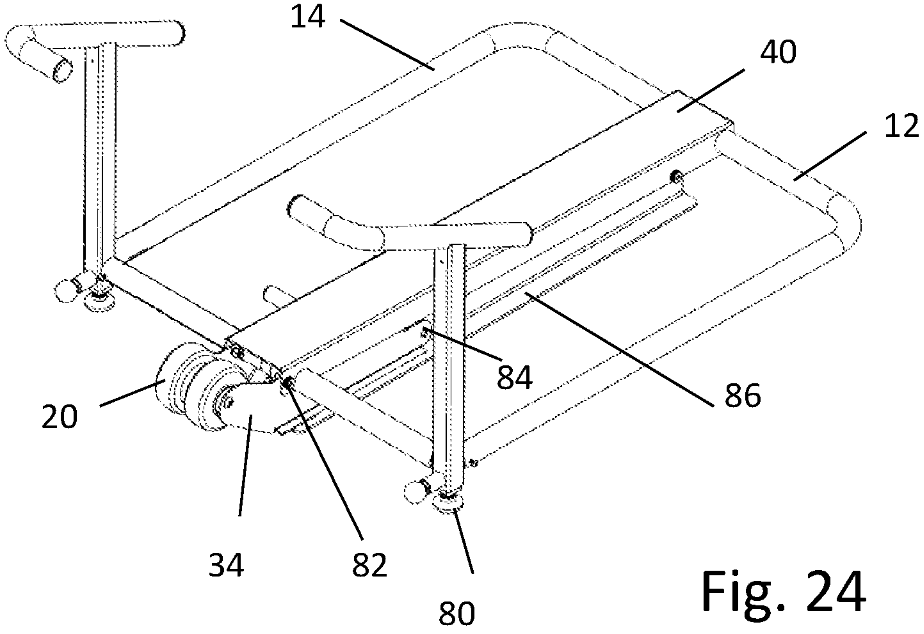
FIG. 24 illustrates a perspective view of another optional embodiment of the apparatus 5.

The preferred way to enable articulation of legs 42 is the leg connection assembly 44. As shown in FIGS. 11-15, leg 42 is pinned to longitudinal member 14 at a first pinned connection 46. That way, leg 42 can rotate relative to longitudinal member 14 as shown in FIG. 11. A pop pin 48 can be used to fix the angle 50 between the longitudinal member 14 and the leg 42 as shown in FIG. 14. While these figures illustrate the preferred connection, those in the art will recognize various ways to achieve this articulating leg functionality. Other ways are shown in FIGS. 22-24. For example, the legs 80 of FIG. 24 articulate linearly and employ a pop pin to fix a given length. To further stiffen frame 10, a third transverse member 52 can be connected between the legs 42.

Figure 18:
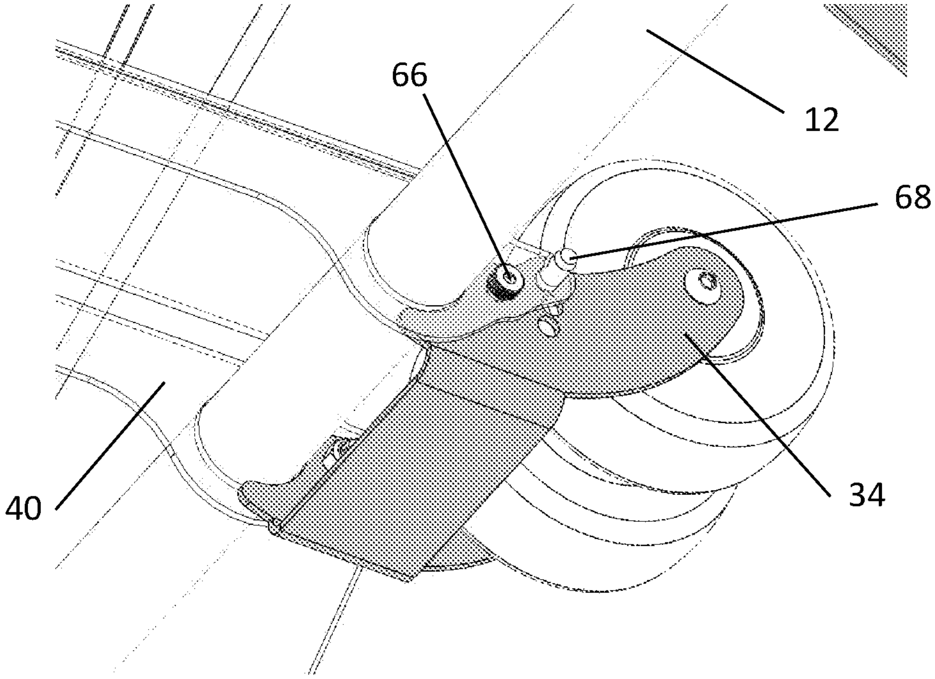
FIG. 18 illustrates a bottom perspective view of the roller assembly of FIG. 16 with the interior longitudinal member shown transparently.
Figure 19:
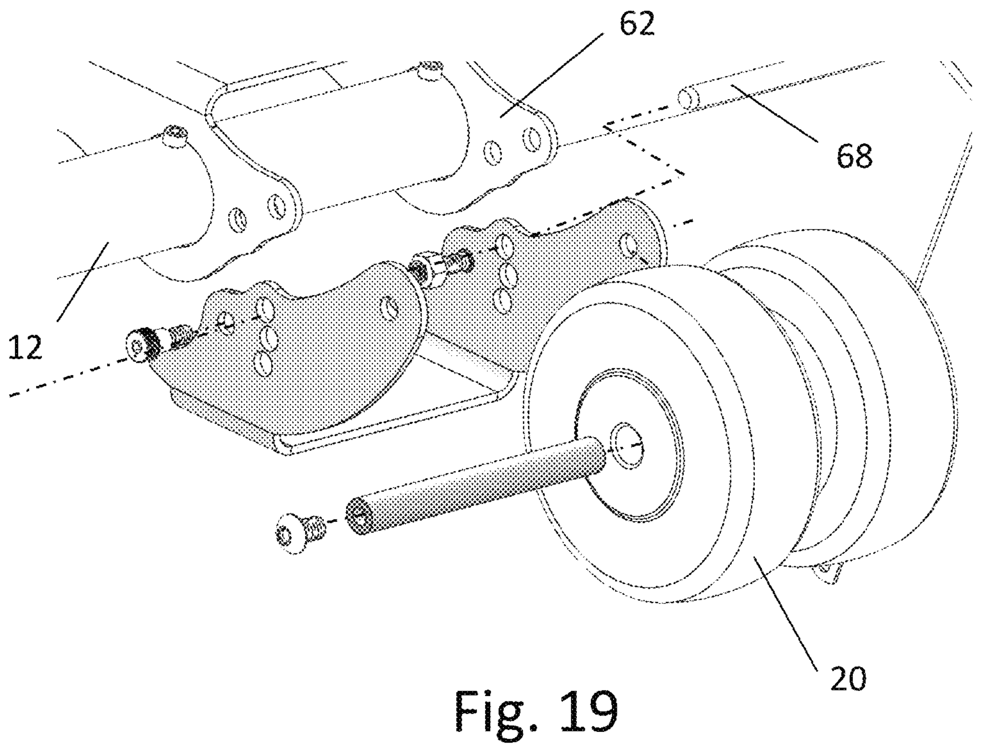
FIG. 19 illustrates an exploded view of the roller assembly of FIG. 16.

Another optional embodiment is an adjustable roller assembly 60. The adjustable roller assembly 60 enables the roller 20 to be adjusted relative to the frame 10. As shown in FIGS. 16-19, the preferred adjustable roller assembly is pinned to flanges 62 extending from the interior longitudinal member 40. As shown in FIG. 18, the second pinned connection 66 pins the vertical member 34 to the flanges 62 so that the vertical member 34 can rotate relative to longitudinal member 14 as indicated in FIG. 11. A second pin 68 can be used to fix the vertical members 34 to the flanges 62 on the longitudinal member 14 to prevent rotation about the second pinned connection 66. The pin 68 can have a lanyard attached to the pin 68 so that it stays with the frame when in is disengaged. While these figures illustrate the preferred connection, those in the art will recognize various ways to achieve this adjustable roller assembly functionality.

Another optional embodiment is a handle assembly. The preferred handle assembly primarily comprises two elements: a handle extension 72 and a handle 74. There are many ways to connect the handle assembly to the frame 10. The preferred way is shown in FIGS. 13-14. The handle extension 72 is a rigid member pinned to the frame 10 via the first pinned connection 46. Like legs 42, the same pop pin 48 can use to fix the handle extension 72 relative to the legs 42 and the longitudinal members 14. Handle 74 can be connected to the opposite end for the handle extension by a myriad of ways known in the art. The first pinned connection 46 permits the handle assembly to rotate relative to the frame. In a storage position, the handle assembly can rotate to rest within the longitudinal member 14 as shown in FIG. 21.

Figure 20:
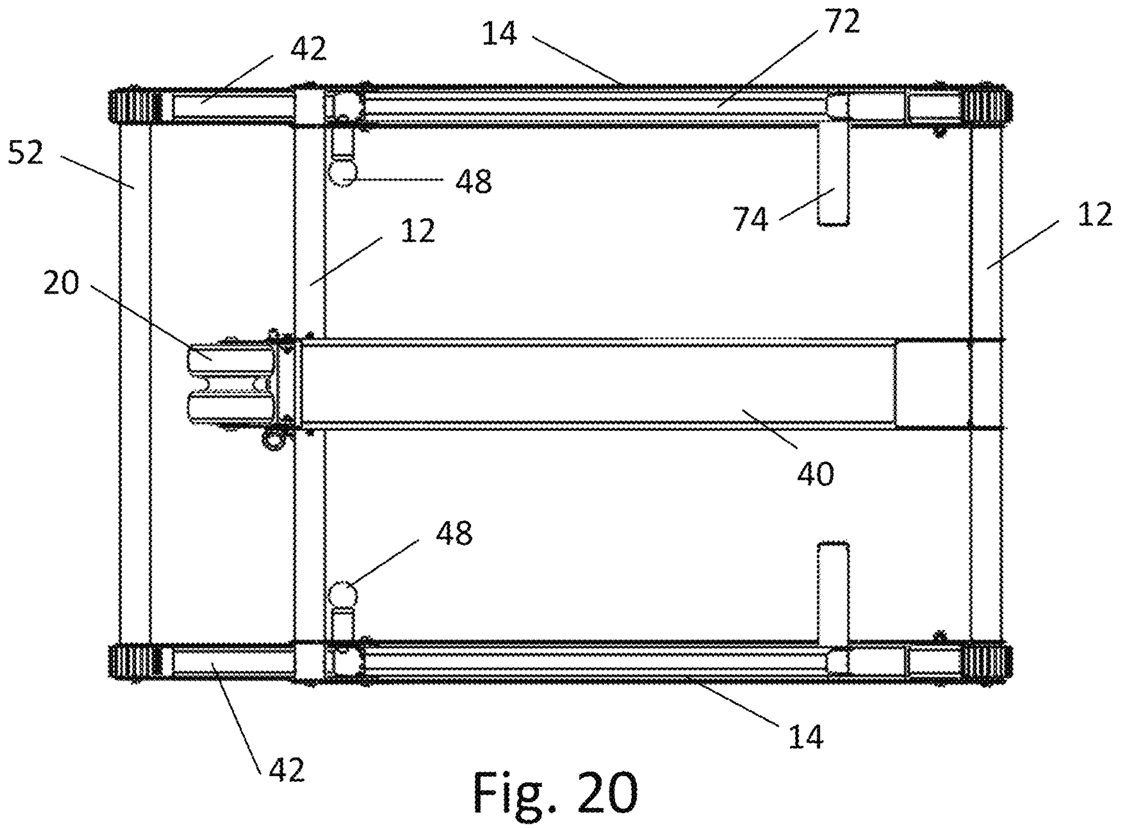
FIG. 20 illustrates a top view of the collapsed position of the apparatus 5 shown in FIG. 10.
Figure 21:
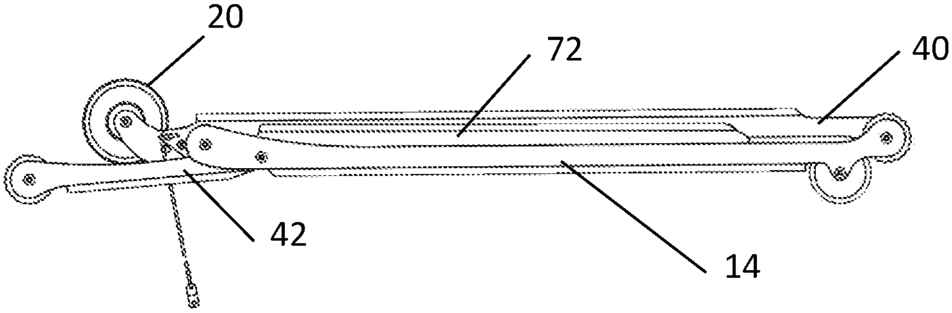
FIG. 21 illustrates a side view of the collapsed position of the apparatus 5 shown in FIG. 10.

The preferred way to store the apparatus 5 is to release pop pins 48 and rotate the handle assembly toward the corresponding longitudinal member 14 so that it fits within (or on top of) the longitudinal member 14 as shown in FIGS. 20-21. Likewise, releasing pop pins 48 allows the legs 42 to rotate relative to the longitudinal members 14 so the whole apparatus flattens as shown in FIGS. 20-21. This way the apparatus 5 can be easily stored under a bed or other storage area.

Several other embodiments of the apparatus 5 are shown in FIGS. 22-24. Of note in FIGS. 22 and 23 is a mechanism to raise the interior longitudinal member 40. Third transverse member 52 can be connected on either end of this mechanism to add stability. FIG. 24 also has pop pins to secure adjustable legs 80 that help support the frame 10. In addition, FIGS. 23 and 24 use a plurality of slots (not shown) to adjust the height of the roller 20 by pinning 82 the vertical support 34 so that it can rotate and can be fixed relative to a base member 84 by pins 86 to raise and lower the roller 20.

Other optional features include rubber "feet" 88 to help keep the apparatus 5 from sliding relative to the floor and walls. Wheels 90 can assist in sliding for storage. And a pin lanyard 92 can keep the pin 68 connected to the apparatus 5 when it is disengaged from the adjustable roller assembly.

While the invention has been described by means of specific embodiments, modifications and variations could be made thereto by those ordinarily skilled in the art without departing from the scope and spirit of the invention set forth in the claims. Likewise, the invention is not limited in its operational application to the above details of mechanical angular and special relationships, users biomechanical positioning, various extremity force producing embodiments and of being practiced or of being potentially operationally carried out in various other ways. The phraseology and terminology used herein is for the purpose of description and should not be regarded as limiting. Unless specified or limited otherwise, the terms "supported," and "coupled" and variations thereof are used broadly and encompass both direct and indirect operational possibilities.

What is claimed is:

1. A spine rolling apparatus comprising, a frame, the frame comprising a first transverse member, a second transverse member, and two longitudinal members, the first transverse member fixedly connected to the two longitudinal members, the frame enclosing an interior section, and a roller connected to a middle of the first transverse member, the roller rotating around a first axis positioned exterior to the interior section.

2. The apparatus of claim 1, the roller comprising a center channel oriented on a circumference of the roller.

3. The apparatus of claim 1, the roller adjustably connected to the middle of the first transverse member.

4. A spine rolling apparatus comprising, a frame, the frame comprising a transverse member and two longitudinal members, the two longitudinal members extending from the transverse member, the frame comprising a perimeter enclosing a center, and a roller assembly comprising a roller, the roller connected to a middle of the transverse member, a centroid of the roller positioned outside of a plurality of planes enclosing the center, the plurality of planes extending perpendicularly from a plane that extends through the two longitudinal members.

5. The apparatus of claim 4, the roller comprising a center channel oriented on a circumference of the roller.

6. The apparatus of claim 4, the roller adjustably connected to the middle of the transverse member.

* * * * *